United States Patent
Aurekoski

(10) Patent No.: US 9,242,732 B2
(45) Date of Patent: Jan. 26, 2016

(54) COOLING SOLUTION IN A TROLLEY OF AN AEROPLANE

(75) Inventor: Jarmo Aurekoski, Tuusula (FI)

(73) Assignee: Icebridge Oy, Tuusula (FI)

( * ) Notice: Subject to any disclaimer, the term of this patent is extended or adjusted under 35 U.S.C. 154(b) by 171 days.

(21) Appl. No.: 13/881,152

(22) PCT Filed: Jun. 15, 2011

(86) PCT No.: PCT/FI2011/050565
§ 371 (c)(1),
(2), (4) Date: Apr. 24, 2013

(87) PCT Pub. No.: WO2012/056086
PCT Pub. Date: May 3, 2012

(65) Prior Publication Data
US 2013/0219948 A1    Aug. 29, 2013

(30) Foreign Application Priority Data

Oct. 25, 2010  (FI) ...................................... 20106098

(51) Int. Cl.
*F25D 3/12* (2006.01)
*F25D 17/06* (2006.01)
*F25D 25/00* (2006.01)
*B64D 11/04* (2006.01)
*B64D 11/00* (2006.01)

(52) U.S. Cl.
CPC ............ *B64D 11/04* (2013.01); *B64D 11/0007* (2013.01); *F25D 3/125* (2013.01); *F25D 2400/20* (2013.01)

(58) Field of Classification Search
CPC ........... F25D 3/12; F25D 17/06; F25D 25/00; F25D 25/024; F25D 3/122; F25D 3/127; F25D 3/14; F25B 9/008
See application file for complete search history.

(56) References Cited

U.S. PATENT DOCUMENTS

| | | | | |
|---|---|---|---|---|
| 1,843,026 A | * | 1/1932 | Hunt | F25D 3/12 165/104.21 |
| 1,980,089 A | | 11/1934 | Rice, Jr. | |
| 2,061,116 A | * | 11/1936 | Thornton | F25D 3/10 62/113 |
| 2,061,776 A | * | 11/1936 | Rice, Jr. | F25D 3/12 62/419 |
| 2,400,742 A | * | 5/1946 | Clerc | F25D 3/14 220/592.03 |
| 2,493,647 A | * | 1/1950 | Wagner | F25D 3/122 236/1 R |
| 2,496,241 A | * | 1/1950 | Wagner | F25D 3/122 62/118 |
| 3,178,903 A | * | 4/1965 | Proctor | F25D 3/14 62/372 |
| 3,820,355 A | * | 6/1974 | Olivares | F25D 3/14 62/384 |
| 3,889,486 A | * | 6/1975 | Hinckley | B65D 88/14 220/1.5 |
| 3,906,744 A | * | 9/1975 | Knapp et al. | 62/384 |
| 3,971,231 A | * | 7/1976 | Derry | 62/388 |

(Continued)

FOREIGN PATENT DOCUMENTS

EP        0863374 A2    9/1998
FI        121171 B     8/2010

(Continued)

*Primary Examiner* — Frantz Jules
*Assistant Examiner* — Erik Mendoza-Wilkenfel
(74) *Attorney, Agent, or Firm* — Seppo Laine Oy

(57) ABSTRACT

The invention relates to an independent refrigerator unit for an inflight service cart. According to the invention, it comprises an insulated casing part, inside which is a refrigerant chamber for a refrigerant, and a thermal conductor connected to the insulated casing, in which there is a first part and a second part, in which case the first part is in direct thermal contact with the refrigerant chamber and the second part with the external space of the casing.

16 Claims, 4 Drawing Sheets

(56) References Cited

U.S. PATENT DOCUMENTS

| | | | | |
|---|---|---|---|---|
| 4,397,159 A | * | 8/1983 | Dodd | 62/382 |
| 4,614,091 A | | 9/1986 | Frank et al. | |
| 5,924,302 A | * | 7/1999 | Derifield | B65D 81/3862 62/371 |
| 2005/0217304 A1 | * | 10/2005 | Sekiyama | 62/371 |
| 2006/0174648 A1 | * | 8/2006 | Lantz | B65D 81/3816 62/371 |
| 2008/0292220 A1 | * | 11/2008 | Zacchi | A61J 1/165 383/3 |
| 2009/0113925 A1 | * | 5/2009 | Korkmaz | 62/447 |

FOREIGN PATENT DOCUMENTS

| | | |
|---|---|---|
| WO | WO 9947023 A1 | 9/1999 |
| WO | WO 2008104639 A1 | 9/2008 |

\* cited by examiner

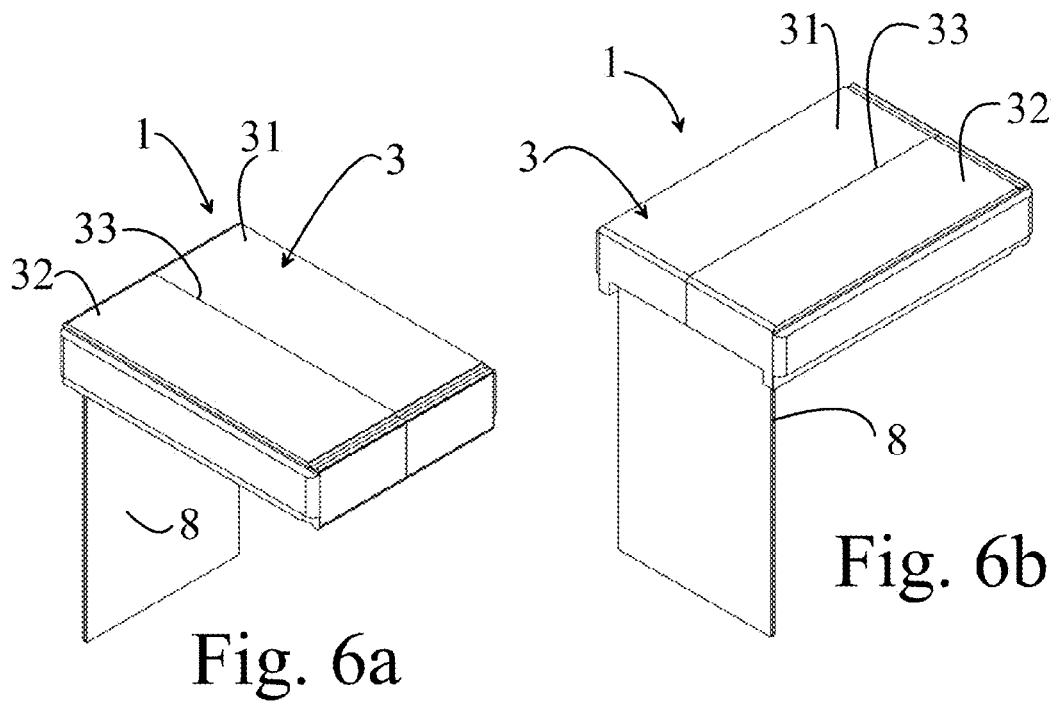
Fig. 6a
Fig. 6b
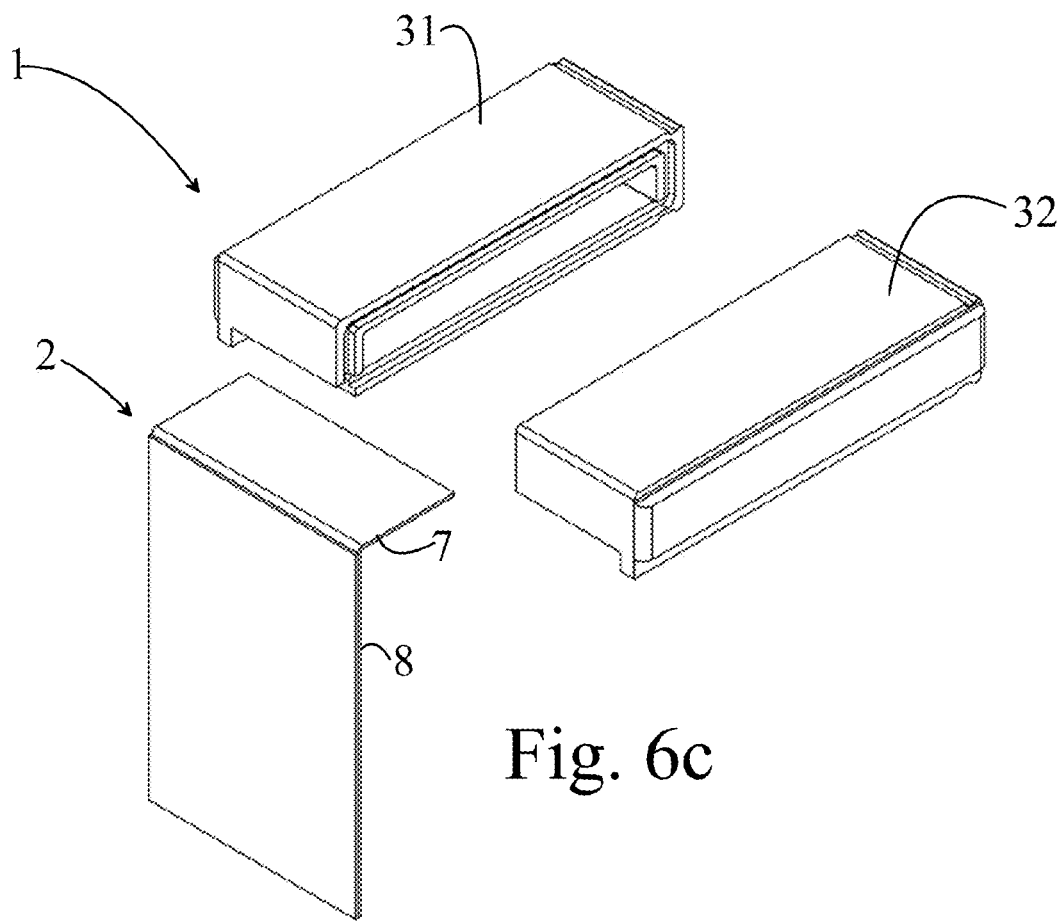
Fig. 6c

COOLING SOLUTION IN A TROLLEY OF AN AEROPLANE

FIELD OF INVENTION

The present invention relates to a refrigeration solution, according to the preamble to claim 1, for an inflight service cart.

BACKGROUND OF THE INVENTION

Inflight service carts, i.e. wheeled serving trolleys, made from aluminium are used in the transportation, storage, and serving of food and beverages in aircraft. In the manufacture of these carts two different dimensioning systems are used internationally, with the cart and cabinet systems in question being named after them. The dimensions of the units according to the ATLAS and KSSU dimensioning standards vary according to the type and model of aircraft.

At present, it is impossible to keep food carts overnight in an aircraft when the aircraft is overnighting at an airport waiting for a return flight in the morning, due to food spoilage. The aircraft's electrical systems are shut down overnight and food in inflight service carts left in the aircraft will spoil if the temperature becomes too high. To remain servable, food products should remain at less than +8° C. until they are served and eaten. The storage of beverage carts too overnight in an aircraft leads to the warming of beverage packages and beverages to be served, and to an unpleasant serving temperature, as well as to spoilage of products, if the product requires refrigerated storage.

The refrigeration and preservation at serving temperature of food trays and beverage drawers transported in inflight service carts generally takes place by means of carbon-dioxide-ice in a sheet or pellet form. As a refrigerant, carbon dioxide ice is very effective, but is often an uneven substance that rapidly chills products and rapidly evaporates.

EP application 08718543 discloses an insulated food-transportation container, in which a refrigerant gel can be used as the refrigerant.

A solution is known from U.S. Pat. No. 3,906,744, in which a refrigerated chamber, from which chilling is led outside the chamber with the aid of a thermal conductor, is attached to the frame of an inflight service cart. The unit is difficult to detach and fill, the solution also does not disclose a solution, by means of which capacity can be increased by increasing the number of units.

SUMMARY OF THE INVENTION

The invention to which the present patent application relates is intended to utilize carbon-dioxide ice in such a way that it releases chilled air evenly, for a long time, and without freezing the products. The invention is intended to reduce the difficulties associated with the transportation and storage of inflight food and beverage packages and to reduce the problem of the unevenness of chilling with carbon-dioxide ice and the resulting freezing of products.

The refrigerator is a metal and foam plastic container (EPP) designed and built according to the internal dimensions of a food and drinks cart, the purpose of which is to extend the storage and serving time of the foods and beverages to be served cold.

The properties of the refrigerator unit (fan) to which the invention relates are based on the tight insulation of dry ice, i.e. carbon-dioxide ice, and on the regulated release of cold air. Carbon-dioxide ice releases carbon dioxide very strongly and cannot be enclosed in an entirely tight container, due to the evaporation pressure. By regulating the release amount of the tightly insulated and evaporating cold air the evaporation rate of the carbon-dioxide ice is reduced by more than 70% and the evaporating air chills the products evenly inside the food and drinks cart. The life and composition of the dry ice remain for longer, compared to a normal situation, in which the dry ice is installed as such on top of a try or metal grille. The refrigerator unit leads cold air evenly along the metal plate to the inside of the service cart. The frame walls made from EPP are in all places about 15-20 mm thick.

Both carbon-dioxide-ice sheets and pellets can be utilized in the independent detachable refrigerator, to which the invention relates. The internal dimensions of the refrigerator are optimized in such a way that a maximum of two (2) one-kilo (1-kg) carbon-dioxide-ice sheets will fit inside it. About 800 g of carbon-dioxide-ice pellets will fit inside the refrigerator, due to the fluffy structure of the pellets. The greatest benefit from the utilization of the refrigerator is the considerable cost savings accruing from the packing, already at the point of departure of the flight, of inflight meals for the return flight too. In addition to the considerable savings, there will be a significant improvement in the even quality and temperature of the products. The cabin crew's work safety will also be improved by nearly totally eliminating the handling of carbon-dioxide ice in the aircraft.

The present lack of an even and sufficiently effective refrigeration method that does not form moisture, which is a major problem in the loading, transportation, storage, and serving of inflight food and beverages, is eliminated through the refrigerator to which the invention relates. The refrigerator unit is also not a permanent part of the aircraft, but instead it can be delivered to the aircraft as a separate unit independent of the other fixed devices and equipment, so that its use in the aircraft is not dependent on the expensive separate type certifications demanded by international aviation organizations.

More specifically, the refrigerator unit according to the invention is characterized by what is stated in the characterizing portion of claim 1.

For its part, the method according to the invention is characterized by what is stated in the characterizing portion of claim 14.

With the aid of the invention, an easily detachable and attachable independent refrigerator unit can be implemented for inflight service carts. Thanks to its detachability and ease of filling, the invention can be easily used in an aircraft environment, in which there is little space to use.

Thanks to its detachability and modular construction, several of the units can be placed in an inflight service cart, so that the chilling/heating effect can always be dimensioned as needed and, in addition, the use of several units will achieve a more even temperature distribution than the prior art.

In the following, the invention is described in greater detail with reference to the accompanying drawings, which elucidate the construction of the invention. In the examination, we use the following terms, together with their related reference numbers:

1 refrigerator unit
2 refrigerator unit's thermal conductor
3 refrigerator unit's thermally insulated part, casing
4 installation grooves for the thermal conductor 2
5 thermal insulator relating to the chilling part of the thermal conductor 2
6 thermal insulator of the thermal conductor 2, relating to the service cart
7 casing part of the thermal conductor 2, first part of the thermal conductor 8 chilling part of the thermal conductor 2, second part of the thermal conductor
9 refrigerant chamber
α angle between parts 7 and 8 of the thermal conductor
10 inflight service cart
11 shelf rails of the service cart
23 joint of the thermal part
31, 32 halves of the casing part
33 joint of the casing part

DEFINITIONS

Operating state: the refrigerator unit 1 is installed in the inflight service cart 10.

Installation state: state, in which the refrigerator unit 1 can be filled with refrigerating material, parts 2 and 3 are at least partly moved away from each other from the operating-state position.

Carbon-dioxide ice: dry ice, which evaporates at a temperature of −78° C.

BRIEF DESCRIPTION OF DRAWINGS

FIGS. 6a-6c show one solution according to the invention.

DETAILED DESCRIPTION OF EXEMPLARY EMBODIMENTS

Figure 1:
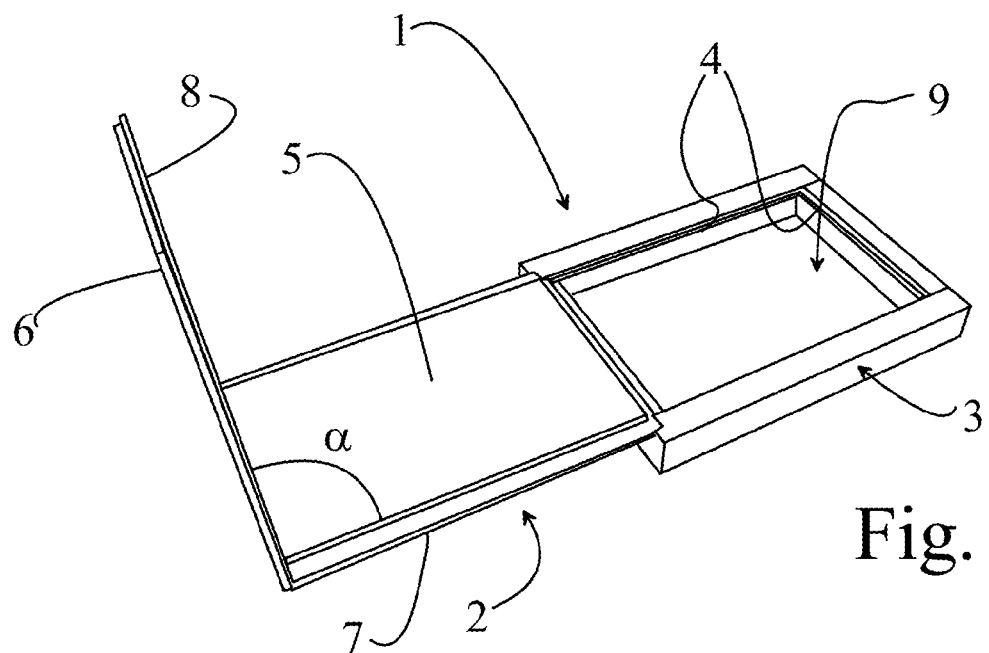
FIGS. 1 and 2 show perspective views of one refrigerator unit according to the invention, seen from different angles and with the refrigerant storage space opened.
Figure 2:
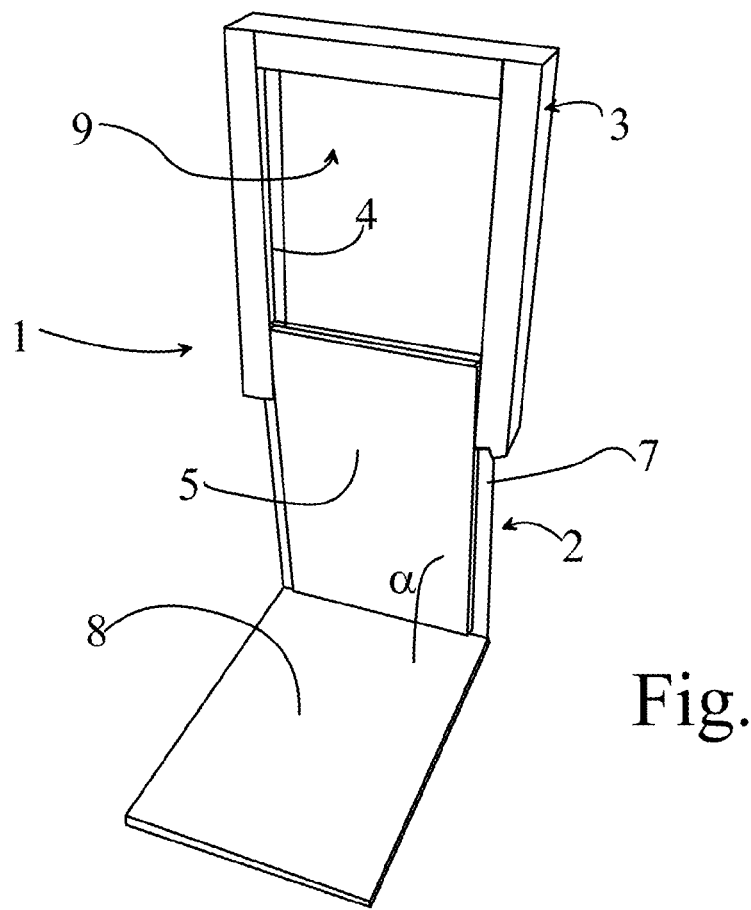

According to FIGS. 1 and 2, the refrigerator unit 1 suitable for an aircraft consists of a casing 3 manufactured from lightweight aluminium and foam polypropylene, to which a light-aluminium plate 2, shaped like a letter L and acting as a thermal conductor 2, is attached. The attachment of the casing 3 and the cover 2 is designed in such a way that the cover 2 is pushed into the casing 3 along grooves 4 in the casing, thus creating tight insulation inside the refrigerator unit 1. The width of the refrigerator unit 1 is such that it can be located on top of the shelf rails 11 of the inflight service cart 10, according to FIG. 3. Alternatively, there can be guides at the sides of the refrigerator unit 1, which are dimensioned in such a way that they permit the refrigerator to be attached to the rails 11 in the upper part of the food or beverage cart of the inflight service cart 10. The temperature of the dry ice, i.e. carbon-dioxide ice, is −78° C. The dry ice evaporates without leaving any moisture around it. Conducting the cold produced by the dry ice along the metal chiller plate produces even chilling in all parts of the cart. In addition, the evaporation of the dry ice forms an excess pressure in the casing 3, which causes a flow into the service cart 10 through the gaps in the casing.

The question is thus of a refrigerator unit 1 typically used in an aircraft, which is used in the inflight service carts 10 used in the aircraft.

The refrigerator unit operates without any electric current, the refrigerant being −78° C. carbon-dioxide ice.

The refrigerator unit 1 contains an L-shaped aluminium plate acting as a thermal conductor 2, which is divided into a casing part 7 forming a cover of the casing 3 of the refrigerator unit and a chilling part 8 acting as the chilling surface in the operating state. Thin, insulating-foam polypropylene strips 5 and 6 about 3-mm thick are attached to the thermal conductor 2, one of which strips 5 forms a cover for the casing 3 in the operating state (see definitions), together with the casing part 7 of the thermal conductor 2. The other 6 insulator is located on that surface of the thermal conductor, which in the operating state faces the rear wall of the inflight service cart 10. Thus, the chilling effect is maximized and the greatest chilling effect of the thermal conductor is created on the rear wall of the service cart, according to FIG. 3, because the other external surfaces of the thermal conductor 2 are insulated. In the example case, the chilling part 8 of the thermal conductor 2 is about 38 cm long and about 28 cm wide on both sides. The casing part 7 of the thermal conductor 2 is in the same order of magnitude as the chilling part 8. The casing part 7 is insulated from outside the casing and the internal surface on the refrigerant chamber 9 side of the casing part is bare, to maximize the transfer of the chilling effect to the casing part 7. The thermal conductor's 2 folding angle α between parts 7 and 8 is about 90 degrees. A casing 3 about 57 cm thick, manufactured from an insulating material, polyurethane or EPP, into the refrigerant chamber 9 inside which the dry-ice sheets (e.g., 2 sheets) are placed, is attached to the casing part 7 of the thermal conductor 2. Thus, in the operating state, the refrigerant chamber 9 is formed inside the casing part 3 enclosed by the casing part 7 of the thermal conductor 2.

The casing 3 insulates the dry ice so that it does not evaporate too rapidly. The cover of the casing 3 is formed by part of the L-shaped aluminium plate 2. About 530 1/1 kg of cold carbon dioxide evaporates from the carbon-dioxide ice. Suitably compressed, the cold air blows out of the casing 3 evenly, in a controlled manner, and over a long time. Part of the cold air is led along the aluminium plate acting as the thermal conductor 2, particularly along its chilling part 7, to the rear and lower parts of the service cart 10, making the service cart like a refrigerator. There can be 1-2 of these refrigerator units 1 inside the service cart and they are able to keep products or trays inside the service cart 10 cold for 13-20 hours. On the basis of tests, the refrigeration is long-term and even. Temperature measurements have shown refrigeration of more than 13 hours for even the worst ambient-air temperature values.

Figure 3:
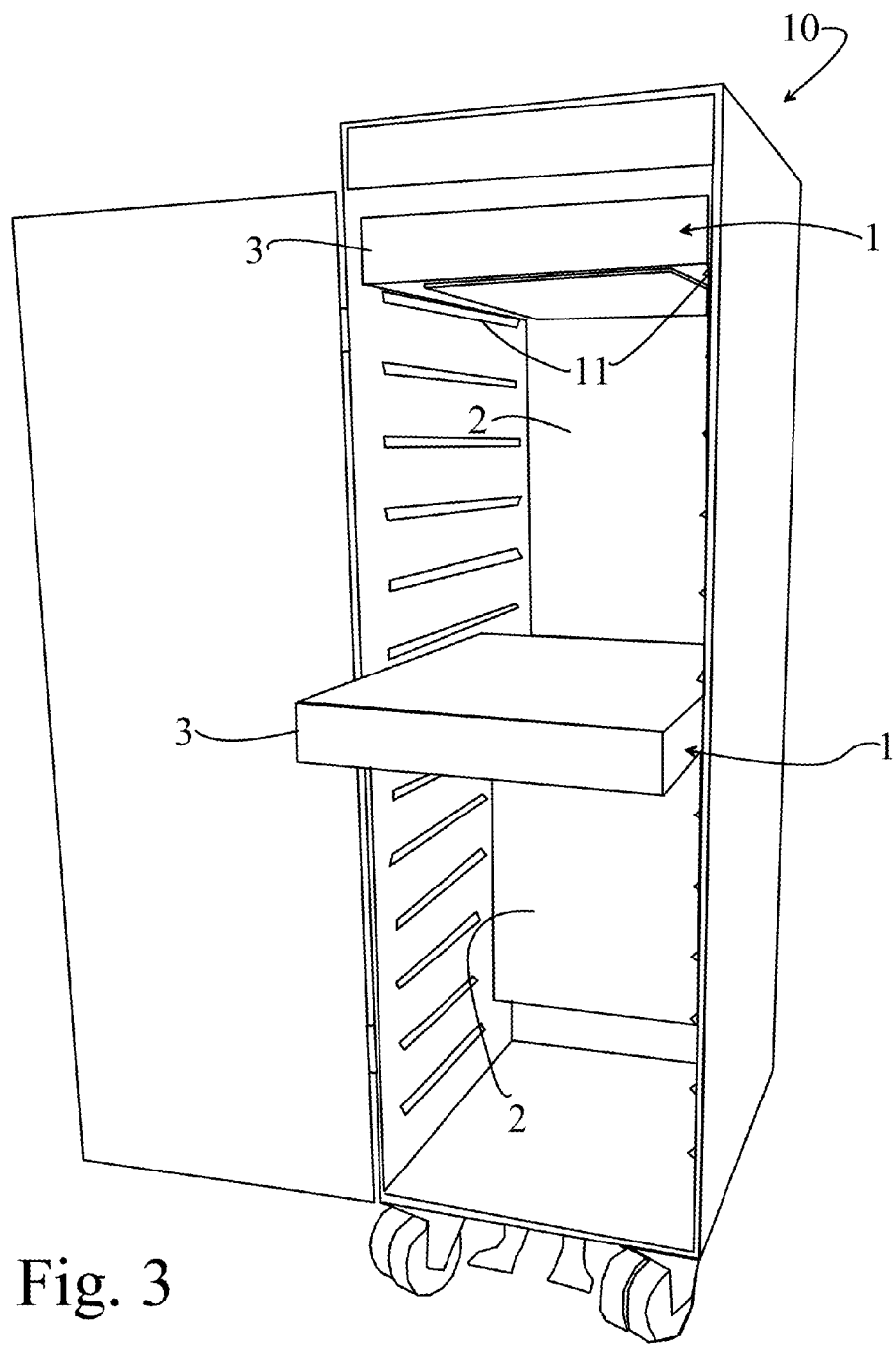
FIG. 3 shows a perspective view of the refrigerator units according to FIGS. 1 and 2, placed in the inflight service cart.

Thus, in the solutions according to FIGS. 1-3 there are the following elements:

In the refrigerator unit, there is an insulated casing 3, to which an element 2 with good thermal conductivity is attached. Inside the casing 3, a chamber 9 for a chilling agent is formed, typically for carbon-dioxide ice. The thermally conductive element 2 is brought into the best possible thermal contact with the refrigerant and part 8 of the thermally conductive element 2 protrudes out of the casing, thus transferring the cold effect into the inflight service cart 10. The chilling part 8 is preferably located in such a way that, in the operating state, it is on the rear wall of the service cart 10. The thermal conductor 2 is preferably L-shaped, within the scope of the invention it can be installed according to the figures, in such a way that the chilling part 8 faces downwards, but the refrigerator unit can equally well be installed in the service cart in such a way that the chilling part 8 faces upwards. The casing part 3 of the lower chilling element of FIG. 3 will then be located on the bottom of the service cart 10 and the upper element in the middle of the cart. The form of installation in the figure is preferable, because cold air tends to drop downwards.

The dimensioning of the refrigerator element 1 is determined by the internal dimensions of the service cart 10 and the distance between the attachment rails 11, in such a way that the refrigerator element will fit by being pushed between a gap between the rails 11. The refrigerant chamber 9 of the casing 3 should be sufficiently tight so that the refrigerant does not evaporate too fast, however, suitably leaky so that the air being chilled can escape from it. Suitable tightness is achieved using normal manufacturing tolerances. The tightness of the refrigerant chamber 9 is preferably designed in such a way that the pressure difference created by the evaporating carbon dioxide will cause a flow through the gaps that evens the temperature inside the service cart 10.

Alternatively, the casing 3 can also be made from an insulating porous material, such as, for example, aerogel, i.e. a micro-porous mixture of silicate foam, fibrous silicate oxide ($SiO_2$), and foam polypropylene.

The size of the refrigerator unit to which the invention relates is preferably designed in such a way that it will fit into all food and drinks transportation carts on the market. The refrigerator unit fits into inflight service carts manufactured according to both the KSSU and ATLAS dimensioning standards. The outer shell of the refrigerator unit is manufactured from light aluminium and EPP. The same materials (aluminium) are utilized in the manufacture of the drawers used inside the carts. The casing part 3 of the refrigerator unit is manufactured from a very highly insulating material and its thermal conductor 2 from aluminium that conducts heat/cold well. Thus, the material of the thermal conductor 2 should be highly thermally conductive and preferably light, because the matter is of an aircraft application. Thus, the material of the thermal conductor can be some other material, such as steel or titanium. At its simplest, the thermal conductor 2 is the solid plate shown in FIG. 13, but there can also be holes or openings in the plate, without the functionality of the invention suffering from this.

Figure 4:
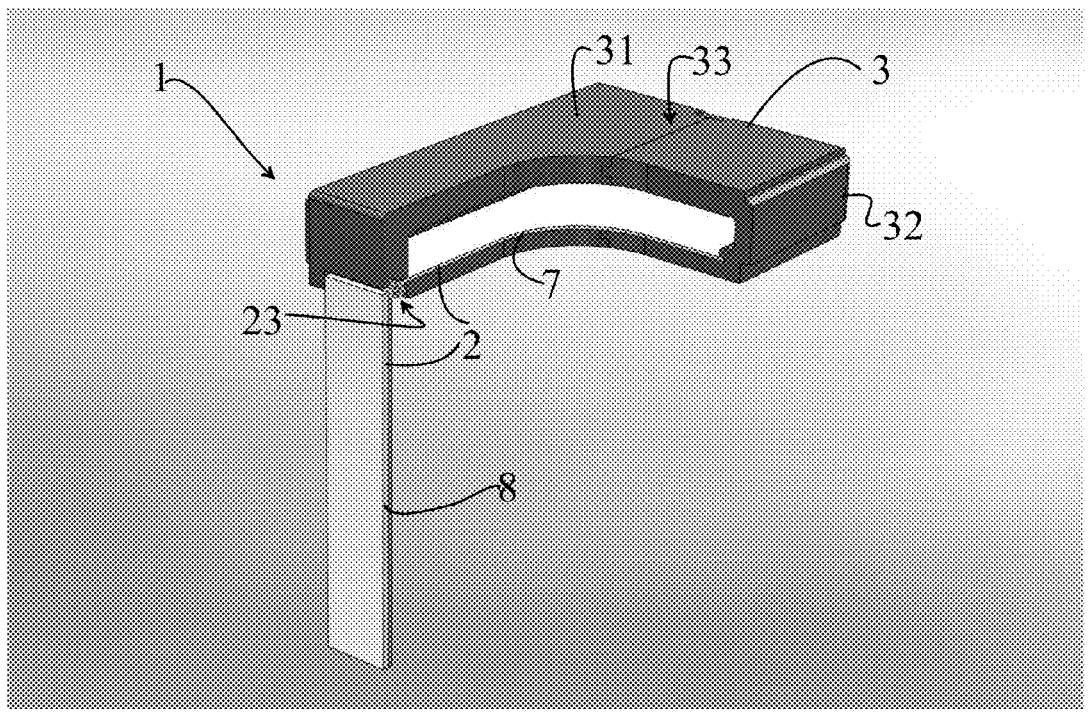
FIG. 4 shows a perspective view of a second embodiment of the invention.
Figure 5:
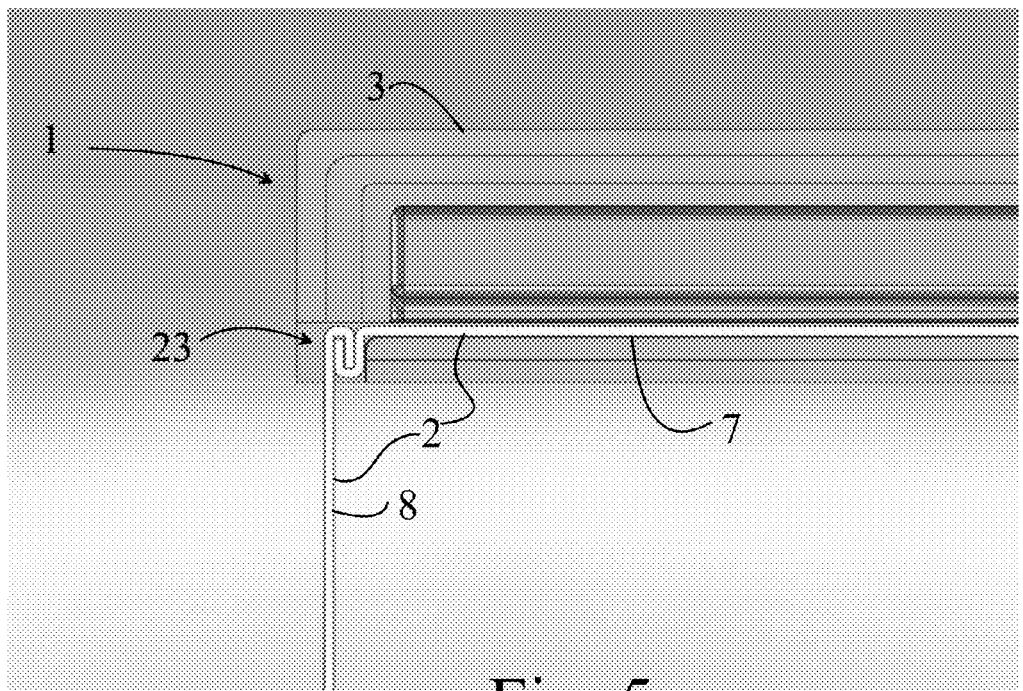
FIG. 5 shows a detail of FIG. 4.

According to FIGS. 4 and 5, the thermal conductor 2 can be formed from two parts, which are connected to each other by a joint that conducts heat well. In this case, a folded joint 23 is used, in which U-bends attached to each other are formed at the ends of parts 7 and 8. Correspondingly, the casing part 3 can be formed from two parts 32 and 31 connected to each other by a grooved profile part 33, between which the thermal conductor 2 is located.

In this embodiment, the casing part 7 of the thermal conductor 2 does not form, as such, part of the casing, but instead the under surface of the casing part 3 acts as an insulator on the under surface of the casing part.

In practice, the warm air inside the inflight service cart is led along the thermal conductor 2 towards a colder substance, i.e. in this case towards the dry ice inside the insulated casing part 3. This movement of the warmer air from warmer towards colder takes place for as long as there is dry ice inside the casing part 3. The excess pressure in the casing part 3 causes the cold air to blow out of the casing part.

In some embodiments of the invention, such as in the embodiment shown in FIGS. 6a-6c, the L-shaped thermal conductor 2 is of such a shape that the part 7 of the thermal conductor 2 protruding inside the casing part 3 is clearly shorter than the part 8, being, in the example solution, only about 10 cm long. This shorter version is more suitable in usability for aircraft conditions and is also lighter. The shortening of the thermal conductor plate 2 from the previous version has not reduced the chilling properties of the device at all.

The solution shown in FIGS. 6a-6c also differs from that shown in FIGS. 4 and 5 in that the thermal conductor 2 is formed from a single uniform part.

In one preferred version of the invention, the L-shaped, typically aluminium thermal conductor 2 is insulated with a layer of natural rubber about 3 mm thick, which is vulcanized onto the surface of the thermal conductor. The rubber is of a foodstuffs grade and withstands the necessary changes in temperature, from −60 degrees to +70 degrees. The surfacing will withstand hard use and machine washing and its elasticity does not suffer due to the changes in temperature conditions. Within the scope of the invention, the insulation can be of some other insulating material.

The invention claimed is:

1. A refrigerator unit for an inflight service cart, which comprises;
a thermal conductor having a first part and a second part,
an insulated casing sized to fit within the inflight service cart, said insulated casing having grooves for releasably affixing the thermal conductor, and
a refrigerant chamber inside the insulated casing,
wherein, when the thermal conductor is releasably affixed to the insulated casing, the first part of the thermal conductor is in direct thermal contact with the refrigerant chamber and the second art of the thermal conductor is in direct thermal contact with an external space of the insulated casing.

2. Refrigerator unit according to claim 1, wherein the thermal conductor is a thermally conductive plate bent into an L shape, the sides of which L form the first and the second parts.

3. Refrigerator unit according to claim 1, wherein at least one surface of at least one part of the thermal conductor is insulated.

4. Refrigerator unit according to claim 1, wherein the second part of the thermal conductor and the surface facing towards the rear wall of the service cart in the operating state of the chilling part are insulated.

5. Refrigerator unit according to claim 1, wherein the insulated casing is of foam polypropylene.

6. Refrigerator unit according to claim 1, wherein the insulated casing is of a porous insulating material and foam polypropylene.

7. Refrigerator unit according to claim 1, wherein the insulated casing is equipped with an opening arrangement, in such a way that, in the operating state, the evaporation of the refrigerant is restricted in such a way that total evaporation takes place at the earliest within 13 hours.

8. Refrigerator unit according to claim 1, wherein the insulated casing comprises installation grooves that, in order to install the thermal conductor as a cover for the casing to close the refrigerant into the refrigerant chamber, in which case the second part of the thermal conductor acts as a chilling surface.

9. Refrigerator unit according to claim 1, wherein carbon-dioxide ice is used as the refrigerating material.

10. Refrigerator unit according to claim 1, wherein the insulated casing is sized to fit into inflight service carts manufactured according to both the KSSU and ATLAS dimension standards.

11. Refrigerator unit according to claim 1, wherein the thermal conductor is formed of two parts connected to each other very well thermally.

12. Refrigerator unit according to claim 1, wherein the insulated casing is formed of two parts connected thermally tightly to each other.

13. An inflight service cart comprising;
a refrigerator unit which is independently detachable from the inflight service cart, wherein the refrigerator unit comprises:
a thermal conductor having a first part and a second part
an insulated casing sized to fit within the inflight service cart, said insulated casing having grooves for releasably affixing the thermal conductor, and
a refrigerant chamber inside the insulated casing, wherein, when the thermal conductor is releasably affixed to the insulated casing, the first part of the thermal conductor is in direct thermal contact with the refrigerant chamber and the second part of the thermal conductor is in direct thermal contact with an external space of the insulated casing.

14. The Refrigerator unit according to claim 1, wherein the refrigerant chamber is surrounded by the insulated casing and the thermal conductor.

15. The Refrigerator unit according to claim 14, wherein the refrigerant chamber is configured such that, when in an operating state, air can escape from said refrigerant chamber.

16. The Refrigerator unit according claim 1, wherein the refrigerant chamber is configured such that release of cold air is regulated.

* * * * *